United States Patent [19]
Tomoiu

[11] Patent Number: 5,237,964
[45] Date of Patent: Aug. 24, 1993

[54] INTERNAL COMBUSTION ENGINE WITH A NEW SEQUENCE OF OPERATION AND COMBUSTION

[76] Inventor: Constantin Tomoiu, 1646 Fairfield Ave., 3rd Fl., Bridgeport, Conn. 06605

[21] Appl. No.: 983,364

[22] Filed: Nov. 30, 1992

[51] Int. Cl.[5] .................... F02B 47/02; F02B 19/02
[52] U.S. Cl. ............................ 123/25 C; 123/255; 123/256; 123/292
[58] Field of Search ............... 123/25 C, 25 A, 25 E, 123/1 A, 255, 256, 292

[56] References Cited

U.S. PATENT DOCUMENTS

| | | | |
|---|---|---|---|
| 4,004,554 | 1/1977 | Kosaka et al. | 123/255 |
| 4,015,424 | 4/1977 | Shinohara | 60/39.6 |
| 4,112,878 | 9/1978 | Heitland et al. | 123/25 A |
| 4,182,278 | 1/1980 | Coakwell | 123/1 A |
| 4,367,698 | 1/1983 | Skala | 123/25 E |
| 4,424,780 | 1/1984 | Trucco | 123/255 |
| 4,558,665 | 12/1985 | Sandberg et al. | 123/25 C |
| 4,589,377 | 5/1986 | Van Dal | 123/25 C |
| 4,827,882 | 5/1989 | Paul et al. | 123/292 |
| 4,846,125 | 7/1989 | Hareyama et al. | 123/255 |
| 4,875,445 | 10/1989 | Imoto et al. | 123/292 |
| 5,115,775 | 5/1992 | Greenwald | 123/256 |
| 5,154,142 | 10/1992 | Kamo | 123/1 A |

Primary Examiner—Willis R. Wolfe
Assistant Examiner—Erick Solis
Attorney, Agent, or Firm—Paul A. Fattibene; Arthur T. Fattibene

[57] ABSTRACT

An internal combustion engine having multiple constant volume combustion chambers associated with each piston of the engine. The combustion within each of the combustion chambers is controlled to obtain fully developed combustion with high pressure resulting in improved efficiencies. Water injectors are used during combustion to increase pressures and lower the temperature of gases within the combustion chambers for controlled release of gases into a cylinder. Ultrasonic energy elements are used to assist in the combustion process. With the use of multiple constant volume combustion chambers for each cylinder, the combustion and release of gas pressure is controlled resulting in greater efficiencies and longevity of the engine.

8 Claims, 4 Drawing Sheets

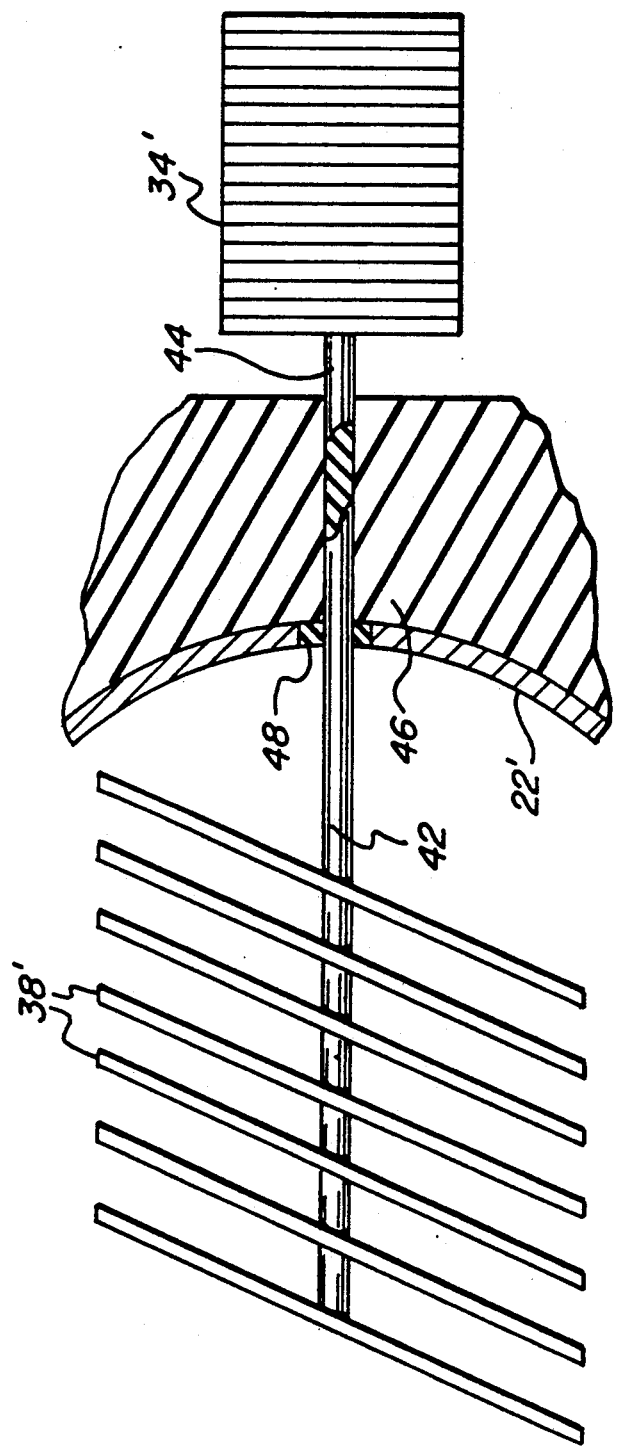

INTERNAL COMBUSTION ENGINE WITH A NEW SEQUENCE OF OPERATION AND COMBUSTION

BACKGROUND OF THE INVENTION

1. Field of the Invention

The present invention relates generally to internal combustion engines and specifically to an engine using water injection and ultrasonic elements to improve efficiency.

2. Description of the Prior Art

There have been many advancements in the design and construction of internal combustion engines in an effort to improve their efficiencies. One such improvement to an internal combustion engine is disclosed in U.S. Pat. No. 4,015,424 entitled "Combustion Engine With Dual Function Motor Element and Rotary Valve for Cyclical Fuel and Exhaust Metering" issuing to Shinohara on Apr. 5, 1977. Therein disclosed is an internal combustion engine having a combustion sustaining chamber and a constant pressure chamber. This permits continuous combustion of the fuel mixture being stably maintained. Resultingly, the amount of poisonous exhaust gas is reduced.

Additionally, water injection into the cylinder of an internal combustion engine has been attempted in an effort to improve the operation of an internal combustion engine. U.S. Pat. No. 4,558,665 entitled "Turbocharged Combustion Engine with Water Injection" issuing to Sanberg et al on Dec. 17, 1985, discloses a turbocharged combustion engine with water injection. Another disclosure of an invention relating to the injection of water or other non-fuel material into internal combustion engines is in U.S. Pat. No. 4,589,377 entitled "Engine" issuing to VanDal on May 20, 1986.

While there have been many improvements to the operation of the internal combustion engine, most have been slight improvements that have not substantially improved the efficiencies and operation of the internal combustion engine. It is therefore necessary to turn away from the teachings of the prior art and establish a new and innovative approach to improving the efficiencies of an internal combustion engine.

SUMMARY OF THE INVENTION

The present invention is directed to an internal combustion engine having a cylinder with a reciprocating piston therein. The cylinder is closed at one end with a combustion unit or head having a plurality of combustion chambers. Each combustion chamber has a constant volume. Each of the plurality of combustion chambers independently communicates with a cylinder. Additionally, each combustion chamber has associated therewith a fuel injector and a water injector, together with an ultrasonic generator. A controller controls the combustion within each of the plurality of combustion chambers so as to maximize the combustion efficiency. The pressurized combustion gases contained in each of the plurality of combustion chambers are controllably released into the cylinder causing the reciprocating piston contained therein to move. By controlling the combustion within each of the plurality of combustion chambers, and having more than one combustion chamber associated with a cylinder, the combustion in each chamber can be optimized independently of the power requirements of the engine.

Accordingly, it is an object of the present invention to provide an internal combustion engine having greater efficiencies.

It is a further object of the present invention to provide an engine that is reliable and requires little maintenance.

It is an advantage of the present invention that reduced combustion gas pollutants are obtained.

It is a further advantage of the present invention that waste heat is reduced.

It is a further advantage of the present invention that greater efficiencies are achieved.

It is a feature of the present invention that multiple constant volume combustion chambers are used for each cylinder and piston.

It is a further feature of the present invention that cooling system requirements are reduced.

These and other objects, advantages, and features will become readily apparent in view of the following more detailed description.

BRIEF DESCRIPTION OF THE DRAWINGS

FIG. 3 is a more detailed illustration of the ultrasonic energy generator used in each combustion chamber illustrated in FIG. 1.

DETAILED DESCRIPTION OF THE PREFERRED EMBODIMENT

Figure 1:
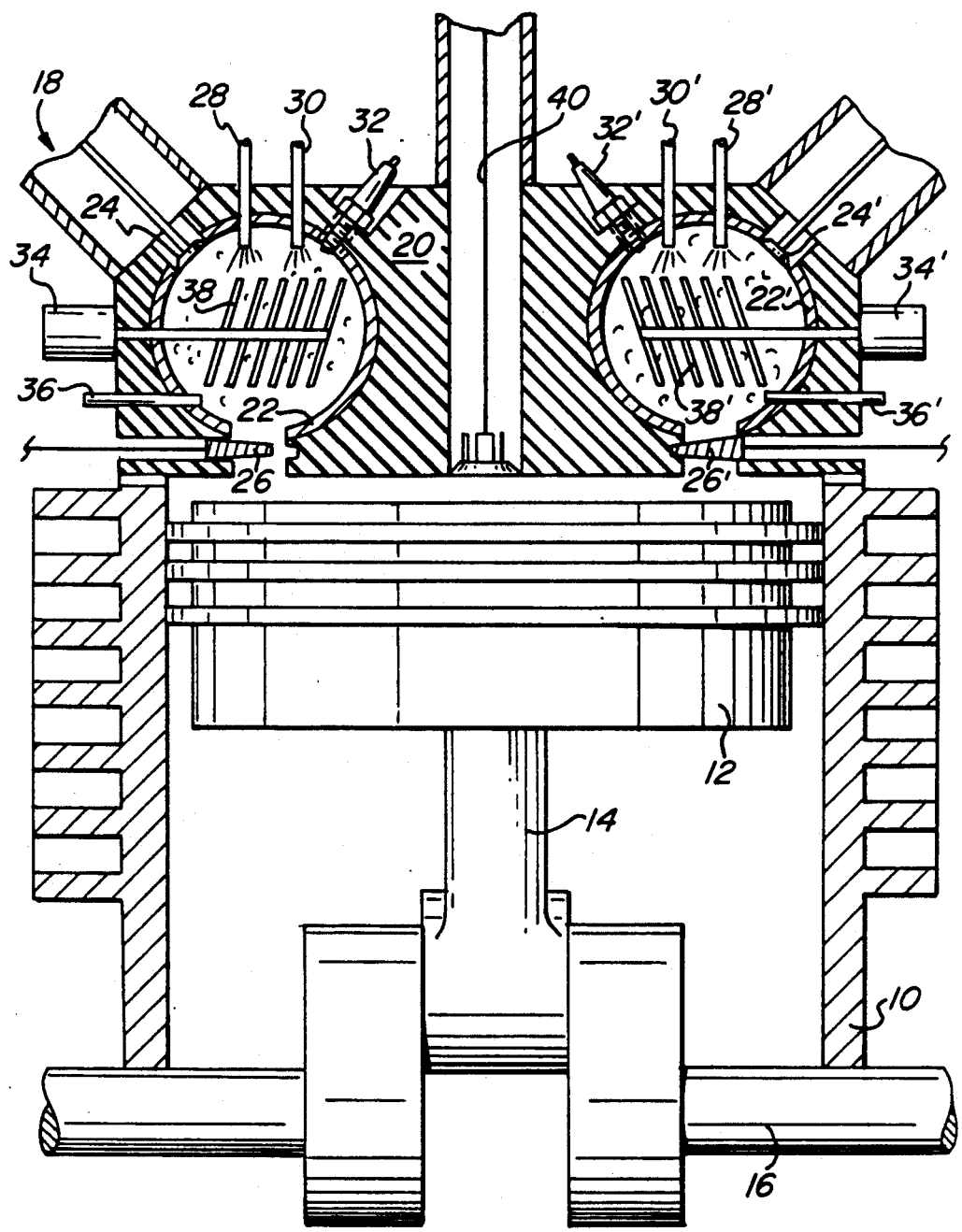
FIG. 1 is a partial cross-sectional view illustrating the present invention.
Figure 2A:
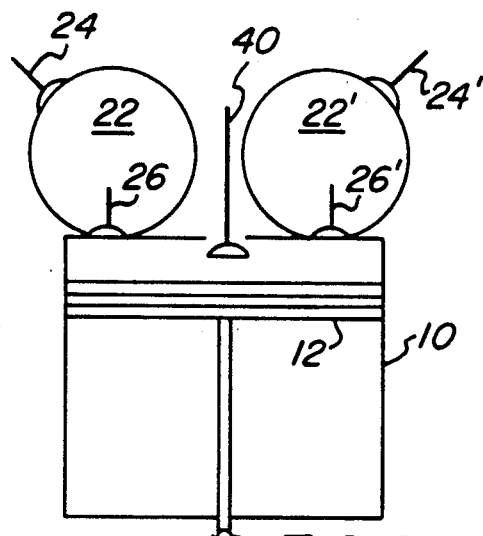
FIG. 2 A-F illustrates the sequential operation of the present invention.
Figure 2B:
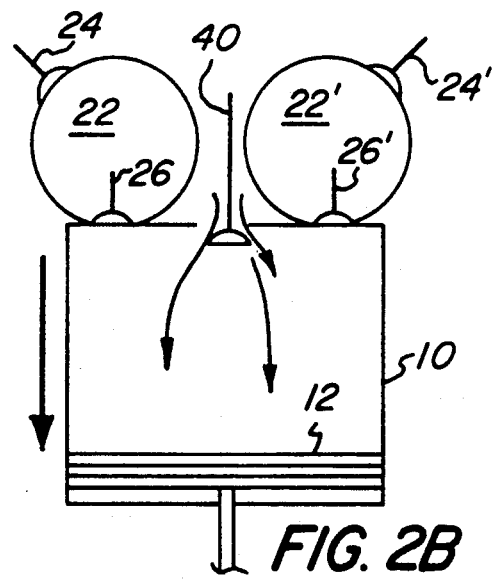
Figure 2C:
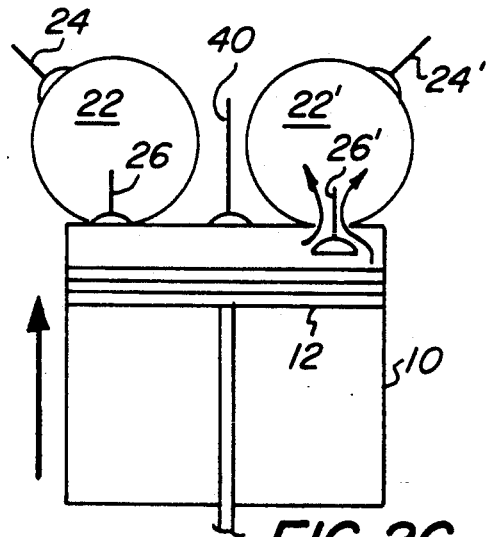
Figure 2D:
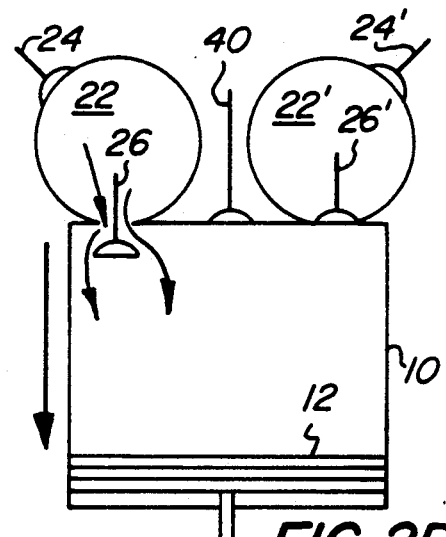
Figure 2E:
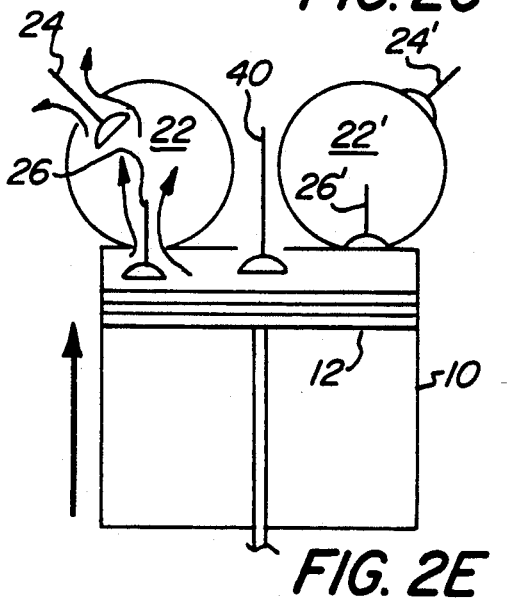
Figure 2F:
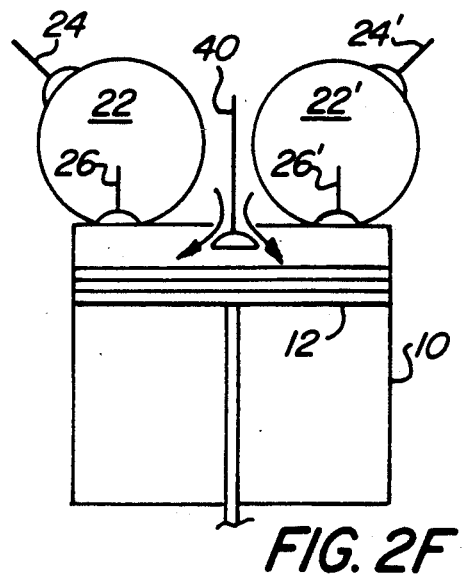

FIG. 1 illustrates the present invention which comprises a cylinder 10 having a reciprocating piston 12 therein. Piston 12 is connected to a rod 14 which, in turn, is connected to a crank shaft 16. On top of the cylinder 10 is a combustion unit 18. Combustion unit 18 comprises a head 20 having a plurality of combustion chambers 22 and 22' therein. The head 20 is thermally insulated. The combustion chambers 22 and 22' are lined with a suitable combustion resistant material. Two combustion chambers 22 and 22' are illustrated. However, there may be more than two combustion chambers 22 and 22' for each piston of an internal combustion engine. Additionally, the combustion chambers 22 and 22' are illustrated as spherical in shape. However, other shapes, such as cylindrical, can easily be used. Each combustion chamber 22, 22' has an exhaust valve 24, 24', a power valve 26, 26', a fuel injector 28, 28', a water injector 30, 30', a spark plug 32, 32', an ultrasonic energy generator 34, 34', and a temperature sensor 36, 36'. The ultrasonic energy generator 34, 34' has ultrasonic energy elements 38, 38' associated therewith. In the center of head 20 is a central valve 40. Central valve 40 acts as an intake and exhaust for the cylinder 10.

In operation, with reference to FIG. 1, fuel is injected into one of the combustion chambers 22 by fuel injector 28. The ultrasonic energy generator 34 and the ultrasonic energy elements 38 assist the fuel in being atomized, and optimize combustion of the fuel. Power valve 36 and exhaust valve 24 are initially closed. Combustion within the chamber 22 is initiated by spark plug 32. After ignition, temperature sensor 36 detects a peak temperature at which point it is determined that combustion has been fully developed. A pressure sensor could be used rather than the temperature sensor 36 to detect a peak pressure signifying fully developed combustion. At the point of fully developed combustion within the combustion chamber 22, water is caused to be injected into the combustion chamber 22 by water injector 30. This results in a lowering of the temperature with an increase in pressure. The increase in pressure is a result of the vaporization of the water. Additionally, a portion of the water injected will be separated into hydrogen and oxygen by the combination of the high temperature and ultrasonic energy. The high pressure within combustion chamber 22 is then controllably released into cylinder 10 by the opening of valve 26. The controlled opening of valve 26 helps to regulate the transfer of pressure from the combustion chamber 22 into the cylinder 10. Resultingly, piston 12 moves causing crank shaft 16 to turn. Typically, a period of time is required for the combustion within combustion chamber 22 to become fully developed and for obtaining the highest pressure at a low temperature. Therefore, a plurality of combustion chambers 22, 22' are used for each cylinder 10. During the time combustion chamber 22 is developing the highest pressure at a low temperature, combustion chamber 22' is being charged.

The co-action of the plurality of combustion chambers 22 and 22' is illustrated in FIG. 2. As an example, in FIG. 2A, while combustion chamber 22 is developing a high pressure at a low temperature, power valves 26 and 26' are closed. Central valve 40 is open. As piston 12 moves downward, air is drawn into the cylinder 10. This is illustrated in FIG. 2B. As the piston 12 is advanced upward, as illustrated in FIG. 2C, power valve 26' is opened and central valve 40 is closed. This causes the air to be compressed and forced into combustion chamber 22'. Power valve 26' is then closed and combustion is initiated in combustion chamber 22'. In the interim, combustion within combustion chamber 22 has become fully developed and achieved a high pressure at a low temperature, permitting power valve 26 to be opened as illustrated in FIG. 2D. The resulting release of pressure causes the piston 12 to be forced downward. Upon the up stroke of piston 12, as illustrated in FIG. 2E, the power valve 26 and the exhaust valve 24 are opened permitting the exhaust gases to be expelled. On the downward stroke of piston 12, as illustrated in FIG. 2F, the center or inlet valve 40 is opened permitting fresh air to enter the cylinder 10. The cycle is then repeated, however, combustion chamber 22 is caused to be charged rather than combustion chamber 22' as illustrated in FIG. 2C. While the operation of the present invention has been illustrated with respect to two combustion chambers 22 and 22', clearly more than two combustion chambers 22 and 22' can be used for one piston. The use of more than one combustion chamber 22 and 22' aids in the development of full combustion with resulting increases in efficiency. Therefore, slower, more fully developed combustion is provided, with provides many advantages of efficiency, reliability, and improved operation. Additionally, while the present invention has been described with reference to a single cylinder, clearly more than one cylinder can be used and connected by a crankshaft as is common in other internal combustion engines.

FIG. 3 illustrates ultrasonic energy generator 34' found within combustion chamber 22'. A similar ultrasonic energy generator 34 is associated with combustion chamber 22. Ultrasonic energy generator 34' transmits through an ultrasonic transmitting shaft 42 ultrasonic energy to elements 38'. Elements 38' are angled approximately 45° from a line perpendicular to the longitudinal axis of shaft 42. The angled ultrasonic energy elements assist in the Coanda effect and additionally help to vaporize or atomize the water and fuel injected into the combustion chamber 22'. This facilitates more complete combustion, as well as ignition of the fuel. A thermally insulated shaft 44 extends from the combustion chamber 22'. A seal or gasket 48 seals the circumference of thermally insulated shaft 44. Additional ultrasonic and thermal insulation 46 is positioned near the thermal insulated shaft 44 and the combustion chamber 22'. The thermally insulated shaft 44 also has the property of transmitting ultrasonic energy. An ultrasonic energy generator 34', as illustrated in FIG. 3, is preferably placed in each of the plurality of combustion chambers 22 and 22'.

Figure 4:
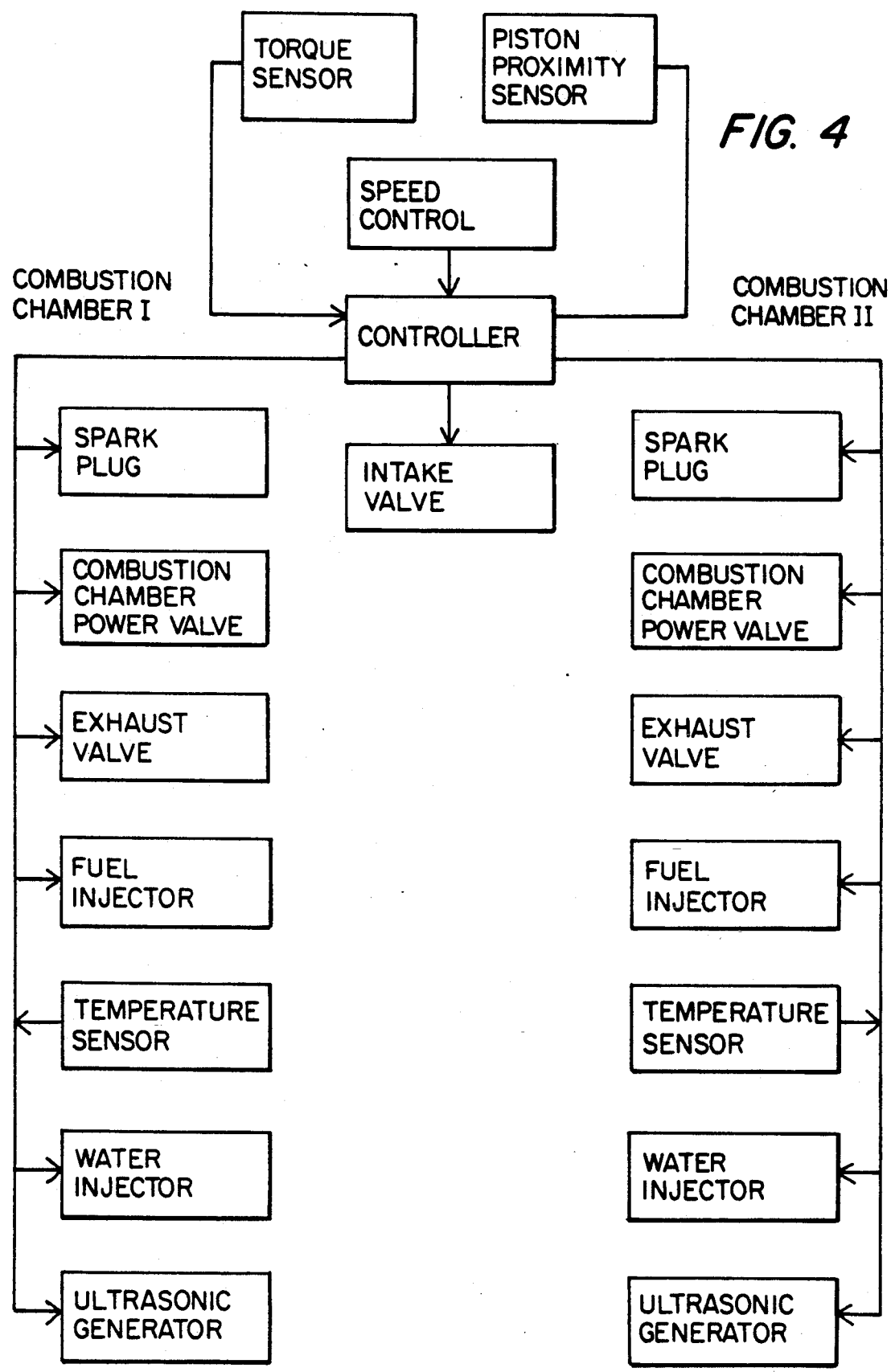
FIG. 4 is a block diagram illustrating the operation of the present invention.

FIG. 4 helps to illustrate the operation of the present invention in block diagram form. Two combustion chambers are represented, however, more than two combustion chambers may be used for a single piston. A controller controls the timing and sequence of combustion and release into the piston of the pressure developed within the combustion chambers. The controller can be any central processing unit or computer having the primary function of controlling the sequence of events for various parameters. The controller has several inputs. The controller has a temperature sensor input for each combustion chamber I and II, input from a torque sensor associated with crank shaft 16, illustrated in FIG. 1, input from a piston proximity sensor, associated with piston 12 illustrated in FIG. 1, and a speed control input. Based on these various inputs, the controller controls the firing of the spark plug, the position of the combustion chamber power valve, the position of the exhaust valve, the timing and quantity of fuel injected, the timing and quantity of water injected, and the operation of the ultrasonic generator for each combustion chamber I and II. The controller also directs the movement of the central valve 40, illustrated in FIG. 1. The piston proximity sensor is used to determine the location of the piston in order to determine whether or not pressurized combustion gases in a combustion chamber should be released. The torque sensor is used to determine whether or not the engine is free running or requires power. The speed control is used to permit the operator to control the speed and power of the engine as required.

The present invention has many practical applications. It will be obvious for artisans skilled in the art to apply the teachings of the present invention. Additionally, although the preferred embodiment has been illustrated and described, it will be obvious to those skilled in the art that various modifications may be made without departing from the spirit and scope of this invention.

What is claimed:

1. An internal combustion engine comprising:
   a cylinder;
   a piston in said cylinder;
   a head attached to said cylinder, said head having a plurality of substantially constant volume combustion chambers therein, said head being thermally insulated;
   combustion chamber valve means, associated with each of said plurality of combustion chambers, for controlling combustion gas pressure between one of said plurality of combustion chambers and said cylinder;

exhaust valve means, associated with each of said plurality of combustion chambers, for exhausting combustion gas;

central valve means, associated with said head and said cylinder, for controlling air entering and exhaust gases exiting said cylinder;

a fuel injector associated with each of said plurality of combustion chambers;

combustion chamber sensor means, associated with each of said plurality of combustion chambers, for detecting fully developed combustion;

a water injector associated with each of said plurality of combustion chambers;

a spark plug, associated with each of said plurality of combustion chambers;

controller means, associated with said combustion chamber valve means, said exhaust valve means, said central valve means, said fuel injector, said combustion chamber sensor means, said water injector, and said spark plug, for controlling combustion within each of the plurality of combustion chambers and release of combustion gases into said cylinder.

2. An internal combustion engine as in claim 1 wherein:
said combustion chamber sensor means is a temperature sensor.

3. An internal combustion engine as in claim 1 wherein:
said combustion chamber sensor means is a pressure sensor.

4. An internal combustion engine as in claim 1 wherein:
the plurality of combustion chambers are spherical.

5. An internal combustion engine as in claim 1 further comprising:
speed control means, associated with said control means, for controlling the speed of the engine.

6. An internal combustion engine as in claim 5 further comprising:
torque sensor means, associated with said piston and a crank shaft, for detecting torque applied to said crank shaft.

7. An internal combustion engine as in claim 6 further comprising:
piston proximity sensor means, associated with said piston and said controller means, for detecting the location of said piston.

8. An internal combustion engine comprising:
a cylinder;
a piston reciprocally mounted in said cylinder;
a crank shaft attached to said piston;
a head attached to said cylinder, said head having at least two spherical combustion chambers therein;

at least two shafts, one of said at least two shafts extending through each of the at least two combustion chambers;

at least two groups of ultrasonic energy elements, one group of said at least two groups of ultrasonic energy elements positioned in each of the at least two combustion chambers on one of said at least two shafts;

at least two ultrasonic energy generators, one of said at least two ultrasonic energy generators associated with each of said at least two shafts;

at least two combustion chamber valves, one of said at least two combustion chamber valves placed between one of the at least two combustion chambers and said cylinder;

at least two exhaust valves, one of said at least two exhaust valves placed within one of the at least two combustion chambers;

a central valve placed within said head and opening into said cylinder;

at least two fuel injectors, one of said at least two fuel injectors associated with each of the at least two combustion chambers;

at least two temperature sensors, one of said at least two temperature sensors associated with each of the at least two combustion chambers;

at least two water injectors, one of said at least two water injectors associated with each of the at least two combustion chambers;

at least two spark plugs, one of said at least two spark plugs associated with each of the at least two combustion chambers;

controller means, associated with said at least two ultrasonic energy generators, said at least two combustion chamber valves, said at least two exhaust valves, said central valve, said at least two fuel injectors, said at least two temperature sensors, said at least two water injectors, and said at least two spark plugs, for controlling combustion within each of the at least two combustion chambers and release of combustion gases into said cylinder;

torque sensor means, associated with said crank shaft and said controller means, for detecting torque applied to said crank shaft;

piston proximity sensor means, associated with said piston and said controller means, for detecting the location of said piston; and speed control means, associated with said control means, for controlling the speed of the engine.

* * * * *